(12) United States Patent
Giffin et al.

(10) Patent No.: US 7,591,507 B2
(45) Date of Patent: Sep. 22, 2009

(54) TIE STRAP FOR CLIMATE CONTROLLED SEAT

(75) Inventors: Steven C. Giffin, Pasadena, CA (US); Scott R. Wolas, Newbury Park, CA (US)

(73) Assignee: Amerigon Incorporated, Northville, MI (US)

( * ) Notice: Subject to any disclaimer, the term of this patent is extended or adjusted under 35 U.S.C. 154(b) by 317 days.

(21) Appl. No.: 11/403,545

(22) Filed: Apr. 13, 2006

(65) Prior Publication Data

US 2007/0241592 A1 Oct. 18, 2007

(51) Int. Cl.
*B60N 3/00* (2006.01)
(52) U.S. Cl. .............. 297/180.1; 297/180.12; 297/463.1; 297/463.2; 297/180.14; 24/16 PB; 248/74.3
(58) Field of Classification Search .............. 297/180.1, 297/180.12, 180.13, 180.14, 463.1, 463.2; 24/16 PB; 248/74.3, 69, 68.1
See application file for complete search history.

(56) References Cited

U.S. PATENT DOCUMENTS

| | | | |
|---|---|---|---|
| 3,136,577 A | 6/1964 | Richard | |
| 3,137,523 A | 6/1964 | Karner | |
| 4,413,857 A | 11/1983 | Hayashi | |
| 4,671,567 A | 6/1987 | Frobose | |
| 4,685,727 A | 8/1987 | Cremer et al. | |
| 4,870,722 A * | 10/1989 | Shell, Jr. .................... 24/16 R |
| 5,002,336 A | 3/1991 | Feher | |
| 5,106,161 A | 4/1992 | Meiller | |
| 5,117,638 A | 6/1992 | Feher | |
| 5,354,117 A * | 10/1994 | Danielson et al. ...... 297/180.15 |
| 5,385,382 A | 1/1995 | Single, II et al. | |
| 5,442,518 A * | 8/1995 | Beam .................... 361/690 |
| 5,597,200 A | 1/1997 | Gregory et al. | |
| 5,626,021 A | 5/1997 | Karunasiri et al. | |
| 5,626,386 A * | 5/1997 | Lush .................... 297/180.13 |
| 5,924,766 A | 7/1999 | Esaki et al. | |
| 5,927,817 A | 7/1999 | Ekman et al. | |
| 6,003,950 A | 12/1999 | Larsson | |
| 6,019,420 A | 2/2000 | Faust et al. | |
| 6,059,018 A | 5/2000 | Yoshinori et al. | |
| 6,062,641 A | 5/2000 | Suzuki et al. | |
| 6,079,485 A | 6/2000 | Esaki et al. | |
| 6,119,463 A | 9/2000 | Bell | |
| 6,145,925 A | 11/2000 | Eksin et al. | |
| 6,164,719 A * | 12/2000 | Rauh .................... 297/180.12 |
| 6,186,592 B1 | 2/2001 | Orizaris et al. | |
| 6,189,966 B1 | 2/2001 | Faust et al. | |
| 6,196,627 B1 | 3/2001 | Faust et al. | |

(Continued)

FOREIGN PATENT DOCUMENTS

DE 10238552 8/2001

(Continued)

*Primary Examiner*—Laurie K Cranmer
(74) *Attorney, Agent, or Firm*—Knobbe Martens Olson & Bear LLP (57) ABSTRACT

A conduit for a climate controlled seat assembly. A first port is at a first end of the body and is in communication with the fluid passage. A second port is at a second end of the body and is in communication with the fluid passage, An attachment device comprising a base that is coupled to the body and a strap that is configured to be wrapped around a wire bundle and be secured to the base.

12 Claims, 10 Drawing Sheets

U.S. PATENT DOCUMENTS

| | | |
|---|---|---|
| 6,206,465 B1 | 3/2001 | Faust et al. |
| 6,330,989 B1 * | 12/2001 | Okamoto .................... 248/74.1 |
| 6,478,369 B1 * | 11/2002 | Aoki et al. ............. 297/180.13 |
| 6,505,886 B2 * | 1/2003 | Gielda et al. ........... 297/180.13 |
| RE38,128 E | 6/2003 | Gallup et al. |
| 6,598,251 B2 | 7/2003 | Habboub et al. |
| 6,604,785 B2 | 8/2003 | Bargheer et al. |
| 6,606,866 B2 | 8/2003 | Bell |
| 6,619,736 B2 | 9/2003 | Stowe et al. |
| 6,626,488 B2 | 9/2003 | Pfahler |
| 6,644,735 B2 | 11/2003 | Bargheer et al. |
| 6,676,207 B2 | 1/2004 | Rauh et al. |
| 6,700,052 B2 | 3/2004 | Bell |
| 6,761,399 B2 | 7/2004 | Bargheer et al. |
| 6,786,541 B2 * | 9/2004 | Haupt et al. .............. 297/180.1 |
| 6,786,545 B2 | 9/2004 | Bargheer et al. |
| 6,807,715 B1 * | 10/2004 | Blair ....................... 24/16 PB |
| 6,808,230 B2 | 10/2004 | Buss et al. |
| 6,828,528 B2 | 12/2004 | Stowe et al. |
| 6,857,697 B2 | 2/2005 | Brennan et al. |
| 6,869,139 B2 * | 3/2005 | Brennan et al. .......... 297/180.1 |
| 6,893,086 B2 | 5/2005 | Bajic et al. |
| 6,938,305 B2 * | 9/2005 | Garver ..................... 24/16 PB |
| 6,976,734 B2 | 12/2005 | Stoewe |
| 7,053,311 B2 * | 5/2006 | Santanda ..................... 174/154 |
| 7,070,231 B1 * | 7/2006 | Wong ..................... 297/180.11 |
| 7,070,232 B2 | 7/2006 | Minegishi et al. |
| 7,108,319 B2 | 9/2006 | Hartwich et al. |
| 7,114,771 B2 | 10/2006 | Lofy et al. |
| 7,143,480 B2 * | 12/2006 | Igarashi .................... 24/16 PB |
| 7,168,758 B2 * | 1/2007 | Bevan et al. ........... 297/180.13 |
| 7,201,441 B2 | 4/2007 | Stoewe et al. |
| 7,243,987 B1 * | 7/2007 | Lorenzo ..................... 296/208 |
| 7,297,874 B2 * | 11/2007 | Yasuda et al. ................ 174/154 |
| 7,331,635 B2 * | 2/2008 | Schwarz et al. ........ 297/452.18 |
| 2002/0050730 A1 * | 5/2002 | Kondo et al. ............. 297/217.3 |
| 2002/0129962 A1 * | 9/2002 | Doshita et al. ............ 174/72 A |
| 2004/0090093 A1 | 5/2004 | Kamiya et al. |
| 2005/0285438 A1 | 12/2005 | Ishima et al. |
| 2006/0087160 A1 | 4/2006 | Dong et al. |
| 2006/0130490 A1 | 6/2006 | Petrovski |
| 2006/0200398 A1 | 9/2006 | Botton et al. |
| 2006/0214480 A1 | 9/2006 | Terech |

FOREIGN PATENT DOCUMENTS

| | | |
|---|---|---|
| DE | 10115242 | 10/2002 |
| WO | WO 02/11968 | 2/2002 |
| WO | WO 03/051666 | 6/2003 |

* cited by examiner

TIE STRAP FOR CLIMATE CONTROLLED SEAT

BACKGROUND OF THE INVENTION

1. Field of the Invention

This invention relates to climate control. More specifically, this invention relates to climate control of a seat.

2. Description of the Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely to warm the vehicle's interior as quickly.

For such reasons, there have long been various types of individualized climate control systems for vehicle seats. Such climate control systems typically include a distribution system comprising a combination of channels and passages formed in the cushion of the seat. Climate conditioned air is supplied to these channels and passages by a climate control device. The climate conditioned air flows through the channels and passages to cool or heat the space adjacent the surface of the vehicle seat.

There are, however, problems that have been experienced with existing climate control systems for seat assemblies. For example, wire bundles are required to provide power and control signals to the climate control device. Manufactures of seat assemblies often require that the wire bundles be secured to the seat assembly at prescribed locations to prevent damage to the wire bundles that can be caused by vibration, movement of the seat and/or objects near the climate control device. Adequately securing the wire bundles to the seat assembly typically requires additional materials (e.g., tape) and increased assembly time.

SUMMARY OF THE INVENTION

Accordingly, one aspect of the present invention comprises a conduit for placing a climate control device in fluid communication with a fluid passage in a cushion. The conduit comprises a body that defines a fluid passage. A first port is at a first end of the body and is in communication with the fluid passage. A second port is at a second end of the body and is in communication with the fluid passage. An attachment device comprises a base that is coupled to the body and a strap that is configured to be wrapped around a wire bundle and be secured to the base.

Another aspect of the present invention comprises a climate controlled seat assembly. The seat assembly includes a seat cushion that has an outer surface comprising a first side for supporting an occupant in a sitting position and a second side. The first side and the second side generally face in opposite directions. An air passage extends from the second side into the seat cushion. A ventilation system is in fluid communication with the air passage. The ventilation system is configured to distribute air from the passage along the support surface of the seat cushion. A fluid system delivers or withdraws air from the ventilation system. A conduit is in fluid communication with the fluid system. A wire bundle is connected to the fluid system. A tie strap is as least partially integrally formed with the conduit and is wrapped around the wire bundle to secure the wire bundle to the conduit.

Another aspect of the present invention comprises a climate controlled seat assembly that includes a seat cushion having an outer surface comprising a first side for supporting an occupant in a sitting position and a second opposing side. An air passage extends from the second side into the seat cushion. A ventilation system is in fluid communication with the air passage. The ventilation system is configured to distribute air from the passage along the support surface of the seat cushion. A fluid system is configured to deliver or withdraw air from the ventilation system. A conduit is in fluid communication with the fluid system. A wire bundle is connected to the fluid system. Means that are integrally formed with the conduit are provided for securing the wire bundle to the conduit.

Another aspect of the present invention comprises a method of assembling a climate controlled seat assembly. In the method, a cushion is provided with a fluid distribution system. A fluid transfer device is coupled the seat assembly. A wire harness is coupled to the fluid transfer device. The wire harness is coupled to the conduit.

Further features and advantages of the present invention will become apparent to those of ordinary skill in the art in view of the detailed description of preferred embodiments which follow, when considered together with the attached drawings and claims.

DETAILED DESCRIPTION OF THE PREFERRED EMBODIMENTS

Figure 1:
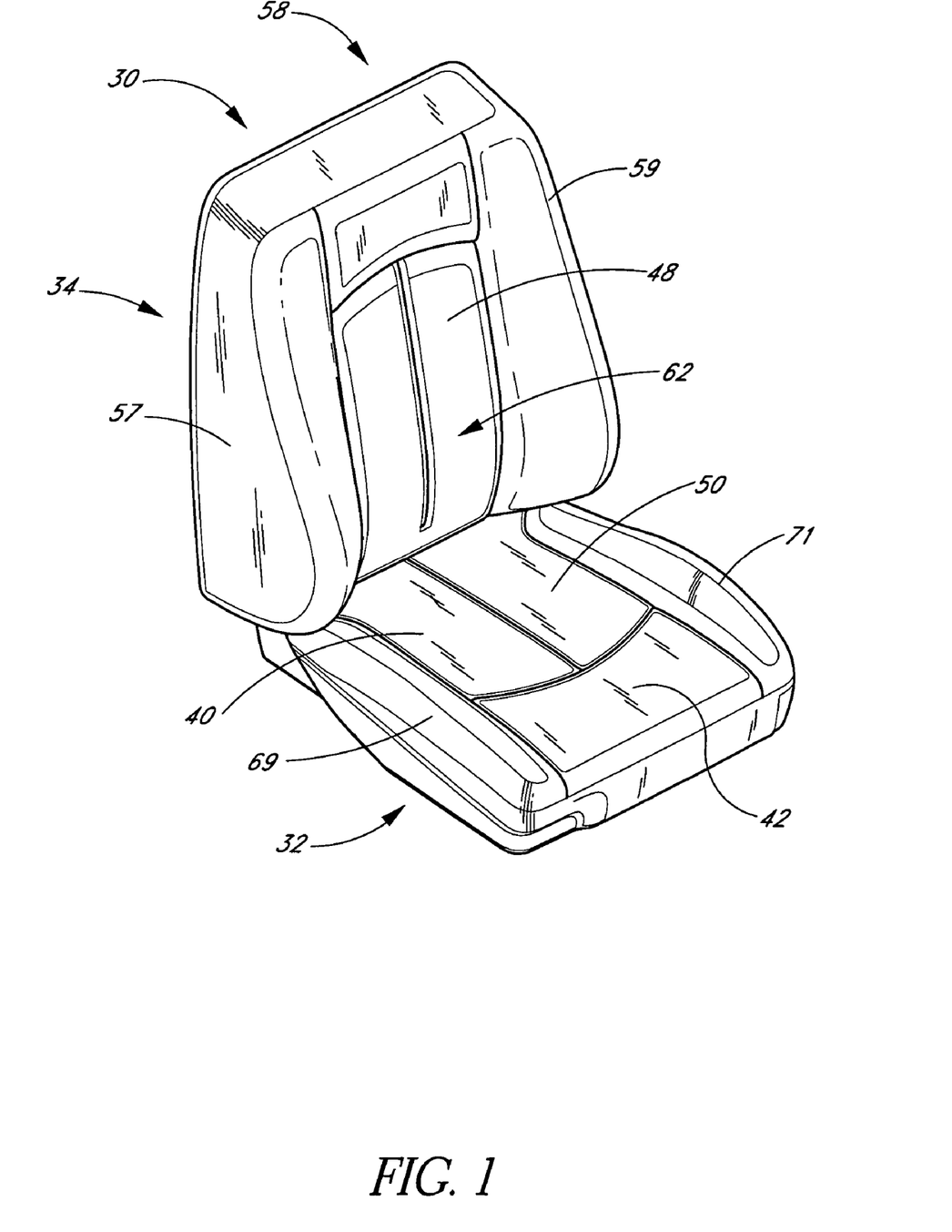
FIG. 1 is a perspective view of a vehicle seat assembly, which includes a climate control system that is configured in accordance with a preferred embodiment of the present invention.
Figure 2:
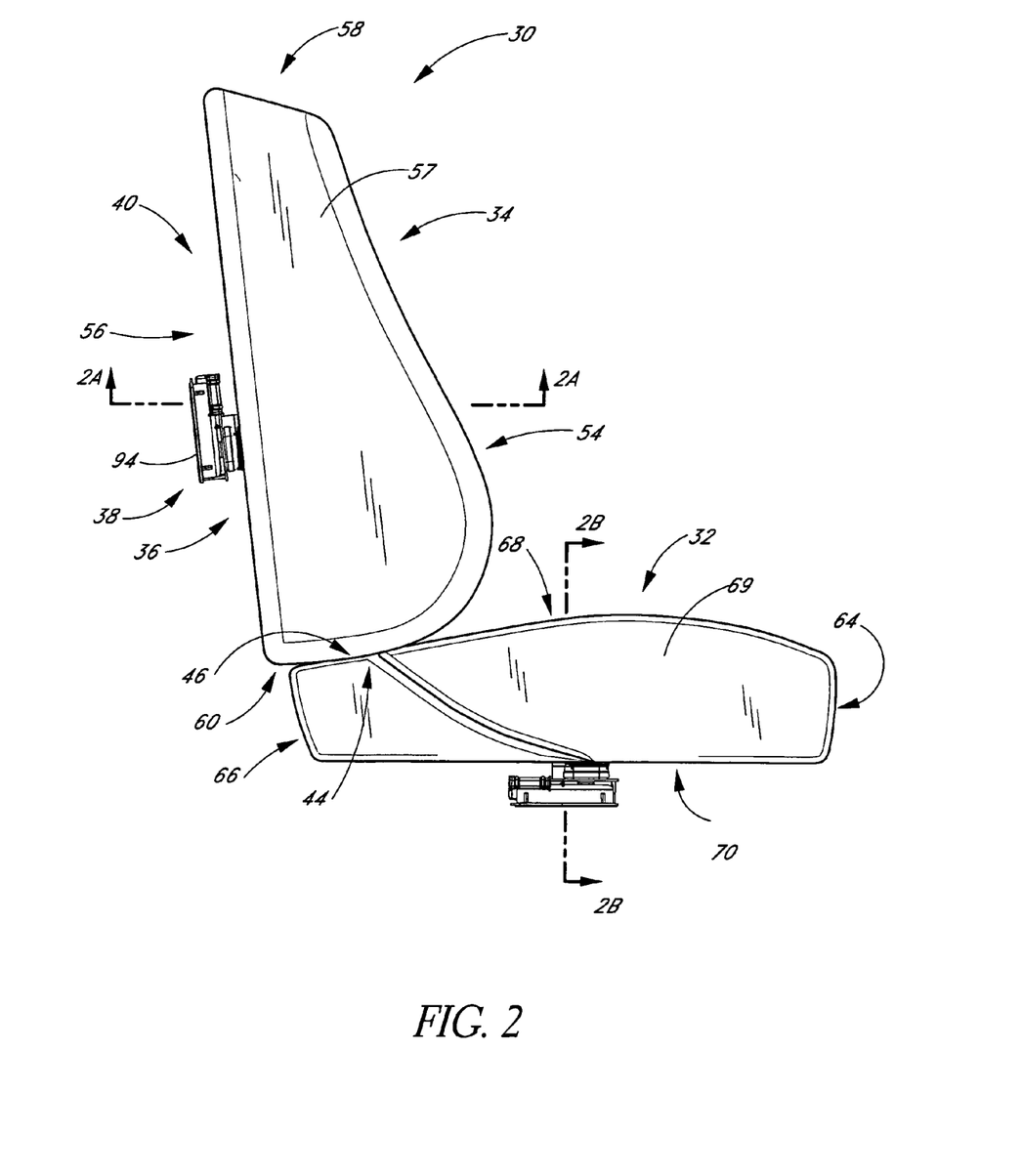
FIG. 2 is a side view of the vehicle seat assembly of FIG. 1.

FIGS. 1 and 2 are front perspective and side views of an embodiment of a climate controlled seat assembly 30. As shown, the seat assembly 30 comprises a seat portion 32 and a backrest 34. The seat assembly 30 also includes a climate control system 36, which will be described in more detail below with reference to FIG. 4.

When an occupant sits in the seat assembly 30, the occupant's seat is located generally in a seat area 40 of the seat portion 32 and at least a portion of their legs are supported by a thigh area 42 of the seat portion 32. In this embodiment, a rear end 44 of the seat portion 32 is coupled to a bottom end 46 of the backrest portion 34. When the occupant sits in the seat assembly 30, the occupant's back contacts a front surface 48 of the backrest portion 34 and the occupant's seat and legs contact a top surface 50 of the seat portion 32. The surfaces 48, 50 cooperate to support the occupant in a sitting position. The seat assembly 30 can be configured and sized to accommodate occupants of various size and weight.

In the illustrated embodiment, the seat assembly 30 is similar to a standard automotive seat. However, it should be appreciated that certain features and aspects of the seat assembly 30 described herein may also be used in a variety of other applications and environments. For example, certain features and aspects of the seat assembly 30 may be adapted for use in other vehicles, such as, for example, an airplane, a boat, or the like. Further, certain features and aspects of the seat assembly 30 may also be adapted for use in stationary environments, such as, for example, a chair, a sofa, a theater seat, a mattress, and an office seat that is used in a place of business and/or residence.

With continued reference to FIGS. 1 and 2, the backrest 34 has a front side 54, a rear side 56, a top side 58 and a bottom side 60. The backrest 34 includes a pair of sides 57, 59 extending between the top side 58 and bottom side 60 for providing lateral support to the occupant of the seat assembly 30. A lumbar region 62 of the backrest 34 is generally positioned between the sides 57, 59 of the backrest 34 near the seat portion 32.

In a similar manner, the seat portion 32 has a front side 64, a rear side 66, a top side 68 and a bottom side 70. The seat portion 32 also includes a pair of sides 69, 71, which extending from the rear side 66 and the front side 64 for providing lateral support to the occupant of the seat assembly 30. In one embodiment, the seat assembly 30 is secured to a vehicle by attaching the bottom side 70 of the seat portion 32 to the floor of a vehicle.

Figure 2A:
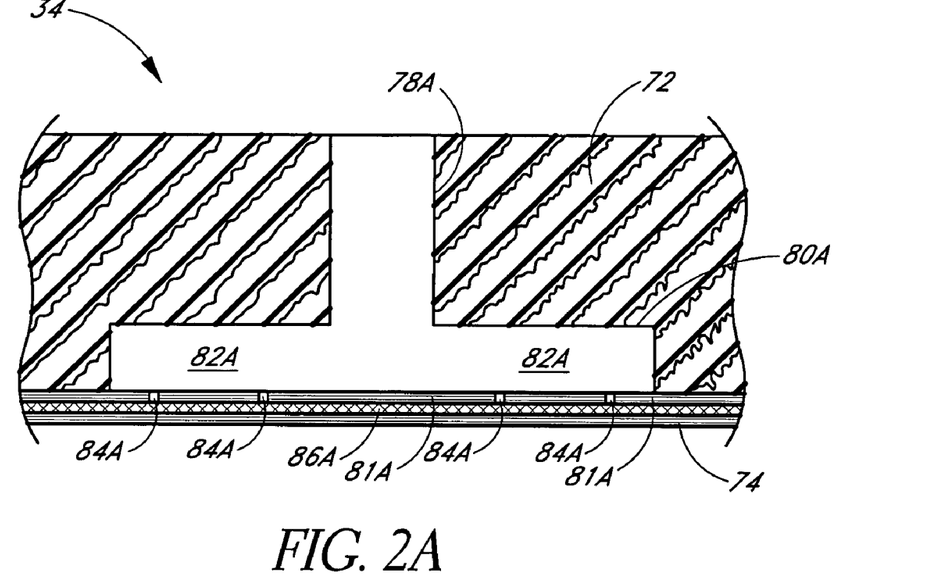
FIG. 2A is a cross-sectional view of the vehicle seat assembly of FIG. 1 taken along line 2A-2A of FIG. 2.
Figure 2B:
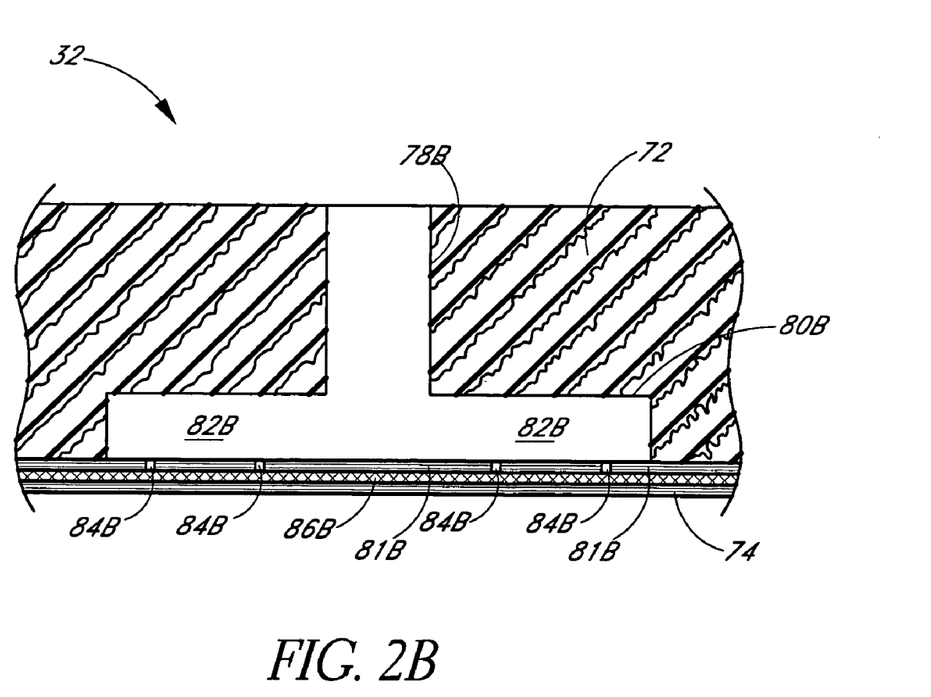
FIG. 2B is a cross-sectional view of the vehicle seat assembly of FIG. 1 taken along line 2B-2B of FIG. 2.

FIGS. 2A and 2B are a cross-sectional views of a portion of the backrest 34 and seat portion 32 respectively. As shown, the backrest 34 and seat portion 32 are generally formed by a cushion 72, which is covered with an appropriate covering material 74 (e.g., upholstery). The cushion 72 is typically supported on a metallic frame (not shown). In some embodiments, springs may be positioned between the frame and the cushion 72. The frame provides the seat assembly 30 with structural support while the cushion 72 provides a soft seating surface. The covering material 74 provides an aesthetic appearance and soft feel to the surface of the seat assembly 30.

Figure 3:
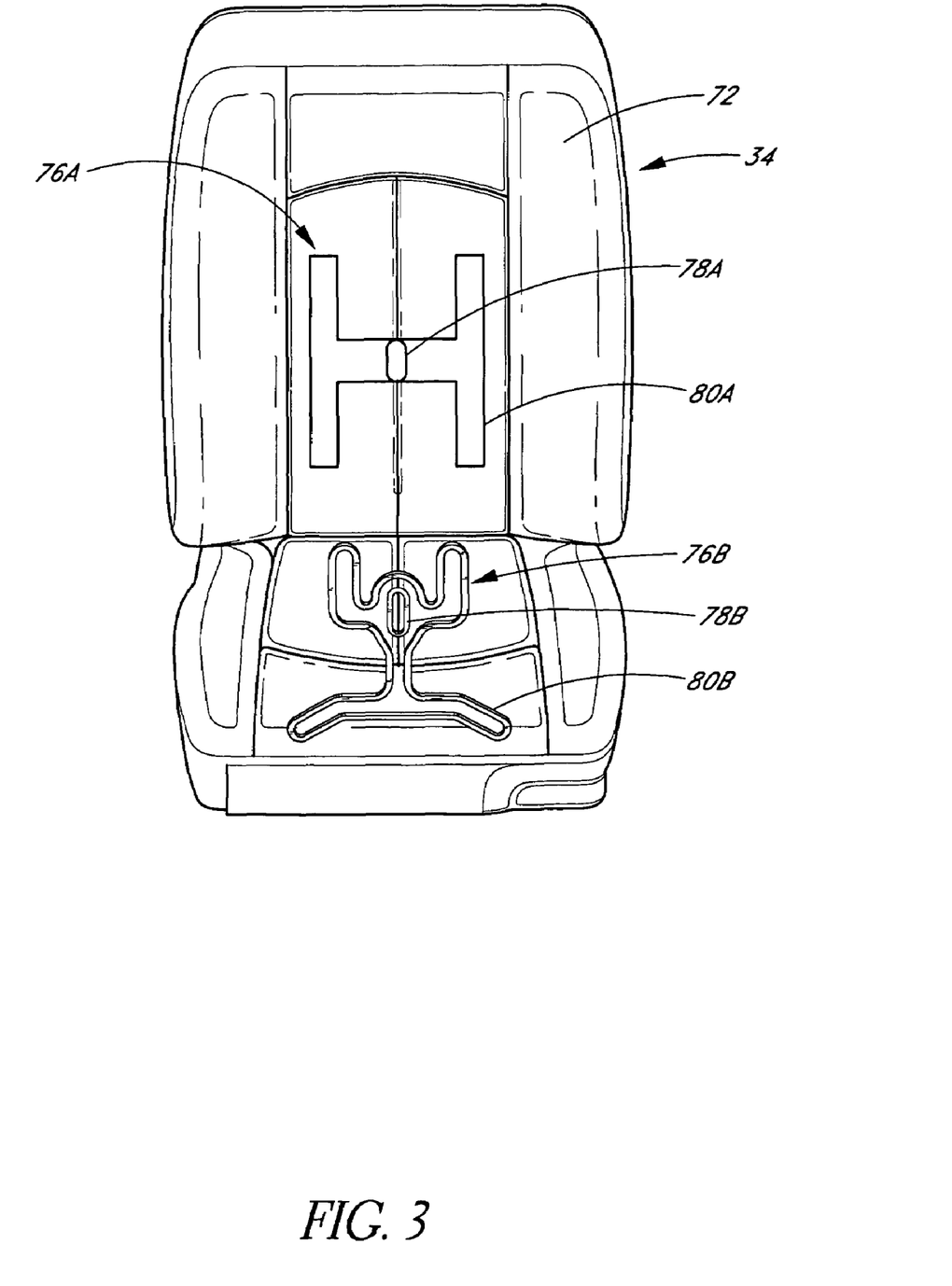
FIG. 3 is a front view of the vehicle seat assembly of FIG. 1 with a covering of the seat assembly removed.

FIG. 3 illustrates the seat assembly 30 of FIGS. 1 and 2 with the covering 74 removed thereby exposing the cushion 72. The cushion 72 can be a typical automotive seat cushion foam or other types of materials with suitable characteristics for providing support to an occupant. Such materials include, but are not limited to, closed or open-celled foam.

As shown in FIG. 3, the backrest 34 of the seat assembly 30 is provided with a backrest fluid distribution system 76A. The distribution system 76A comprises an inlet passage 78A through from the front side 54 to the rear side 56 of the seat cushion 72. (See also FIG. 2A). The distribution system 76A also includes at least one, and often, a plurality of channels 80A, which extend from the inlet passage 78A.

As mentioned above, the cushion 72 may be formed from a typical automotive cushion material, such as, for example, an open or closed cell foam. In one embodiment, the cushion 72 is made of foam that is pre-molded to form the passage 78A and/or the channels 80A. In another embodiment, the passage 78A and/or the channels 80A may be formed by cutting foam out of the seat cushion 72.

With reference back to FIG. 2A, the channels 80A are covered by a scrim 81A to define distribution passages 82A for transporting air through the seat assembly 30. The scrim 81A includes one or more openings 84A for delivering air to and/or from the distribution passages 82A. The scrim 81A may be formed of a material similar to the cushion 72. In the illustrated embodiment, the scrim 81A is attached to the cushion 72 in a manner that limits leakage between the scrim 81A and cushion 72 thereby directing the flow of air through the openings 84A. In one embodiment, an adhesive is used to attach the scrim 81A to the cushion 72. In other embodiments, a heat stake or fasteners may be used.

With continued reference to FIG. 2A, a distribution layer 86A is disposed between the scrim 81A and the seat covering 74. The distribution layer 86A spreads the air flowing through the openings 84A along the lower surface of the covering 74. To permit airflow between the distribution layer 86A and the spaces proximal to the front surface 48 of the backrest 34, the covering 74 may be formed from an air-permeable material. For example, in one embodiment, the covering 74 comprises an air-permeable fabric made of natural and/or synthetic fibers. In another embodiment, the covering is formed from a leather, or leather-like material that is provided with small openings or apertures.

With reference to FIGS. 2B and 3, the seat 32 of the seat assembly 30 is provided with a seat cushion fluid distribution system 76B. The seat distribution system 76B also comprises an inlet passage 78B through from the top side 68 to the bottom side 70 of the seat cushion 72. As with the backrest distribution system 76A, the seat distribution system 76B also includes at least one, and often, a plurality of channels 80B, which extend from the inlet passage 78B. These channels 80B may be configured as described above.

In the seat distribution system 76B, the channels 80B are also covered by a scrim 81B to define distribution passages 82B for transporting air through the seat assembly 30. The scrim 81B includes one or more openings 84B for delivering air to and/or from the distribution passages 82B. As described above, the scrim 81B may be formed of a material similar to the cushion 72 and is preferably attached to the cushion 72 in a manner that limits leakage between the scrim 81B and cushion 72. A distribution layer 86B is disposed between the scrim 81B and the seat covering 74.

As will be explained in more detail below, in one embodiment, conditioned air is delivered to the distribution passages 82A, 82B through the inlet passages 78A, 78B. The air then flows through the openings 84A, 84B and into the distribution layer 86A, 86B. The air is then directed through the covering 74 to a space adjacent to the front surface 48 of the backrest 34 or the top surface 50 of the seat 32. In another embodiment, the climate control system 36 is used to remove air, which is adjacent to the front surface 48 of the backrest 34 and/or the top surface 50 of the seat 32. In such an embodiment, the air is withdrawn through the covering 74 and into the distribution layers 86A, 84B. The air is then withdrawn through the openings 84A, 84B, into the distribution passages 82A, 82B and through the inlet passage 78A, 78B.

Given the goal of distributing air through the cushion 72 and along the covering 74, those of skill in the art will recognize that the distribution systems 76A, 76B for the backrest 34 and the seat 32 may be modified in several different manners. For example, the shape and/or number of channels 80A, 80B may be modified. In other embodiments, the scrim 81A, 81B and/or distribution passages 82A, 82B may be combined and/or replaced with other components configured for similar functions. In yet another embodiment, a separate insert may be positioned within the channels 80A, 80B for distributing the air. See e.g., co-pending U.S. patent application Ser. No. 10/853,779, filed May 25, 2004, the entire contents of which are hereby incorporated by reference herein. In other embodiments, the distribution systems 76A, 76B or portions thereof may be combined with each other.

Figure 4:
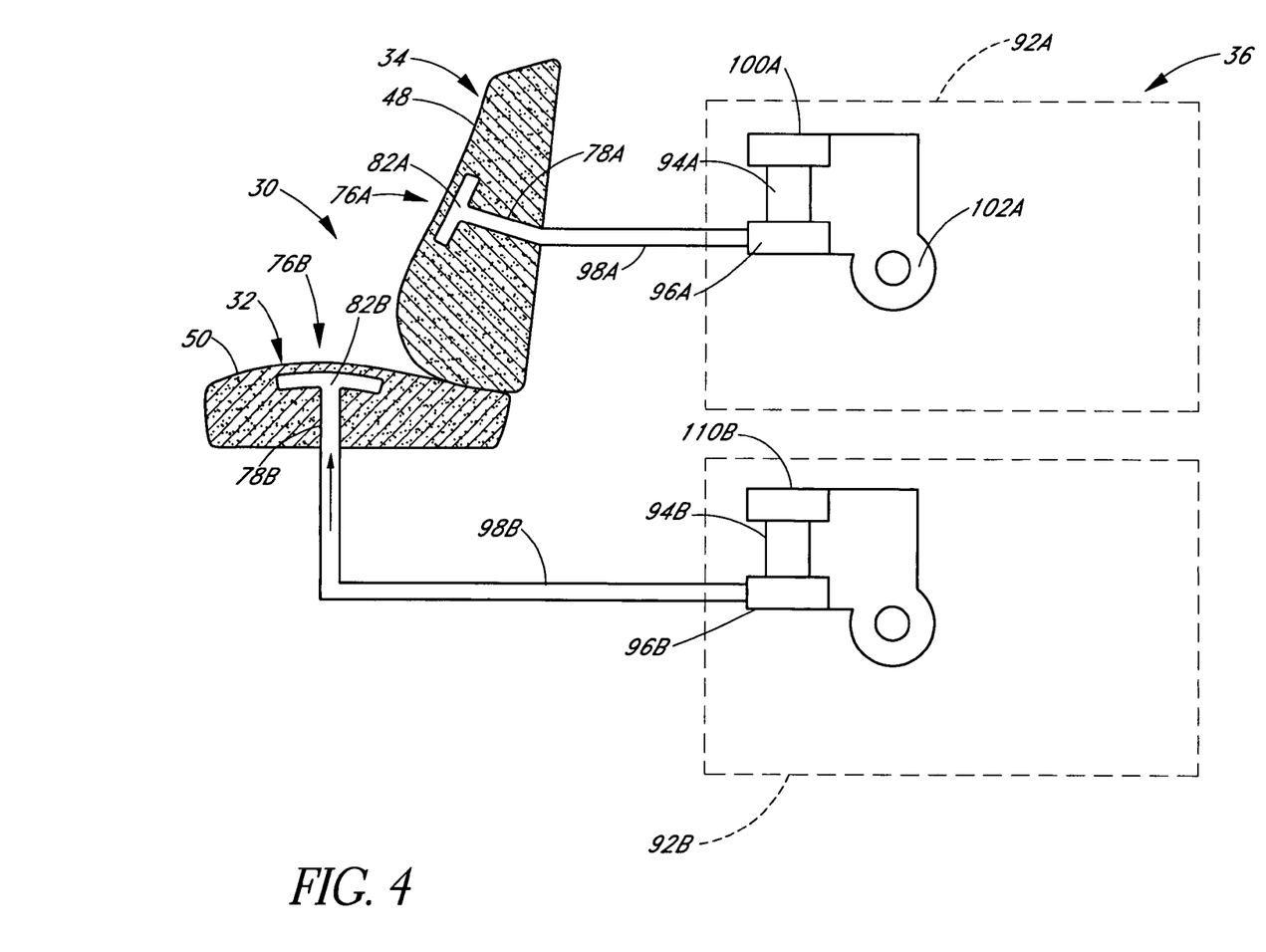
FIG. 4 is a schematic illustration of the vehicle seat assembly and climate control system of FIG. 1.

FIG. 4 is a schematic illustration of the climate control system 36. In the illustrated embodiment, the climate control system includes a back thermal module 92A and seat thermal module 92B. As will be explained below, both thermal modules 92A, 92B are configured to provide conditioned air (and/or to remove air in some embodiments) to the distribution systems 76A, 76B described above. In this manner, the thermal modules 92A, 92B provide a fluid flow to either warm or cool the front surface 48 of the backrest 34 and the top surface 50 of the seat portion 32 respectively. Specifically, the climate control apparatus 36 preferably provides conditioned air that is either heated or cooled relative to the temperature of the front surface 48 of the back rest 32 and the top surface 50 of the seat 32.

In the illustrated embodiment, the thermal modules 92A, 92B preferably each include a thermoelectric device 94A, 94B for temperature conditioning (i.e. selectively healing or cooling) the fluid flowing through the device 94A, 94B. A preferred thermoelectric device 94A, 94B is a Peltier thermoelectric module, which is well known in the art. The illustrated thermal modules 92A, 92B preferably also include a main heat exchanger 96A, 96B for transferring or removing thermal energy from the fluid flowing through the modules 92A, 92B and to the distribution systems 76A, 76B. Such fluid is transferred to the distribution systems 76A, 76B through ducting 98A, 98B (see e.g., U.S. application Ser. No. 10/973,947, filed Oct. 25, 2004, which is hereby incorporated by reference herein). The modules 92A, 92B also preferably include a secondary heat exchanger 100A, 100B that extends from the thermoelectric device 94A, 94B generally opposite the main heat exchanger 96A, 96B. A pumping device 102A, 102B is preferably associated with each thermal module 92A, 92B for directing fluid over the main and/or waste heat exchangers 96A, 96B, 100A, 100B. The pumping devices 102A, 102B may comprise an electrical fan or blower, such as, for example, an axial blower and/or radial fan. In the illustrated embodiment, a single pumping device 102A, 102B may be used for both the main and waste heat exchanges 96A, 96B, 100A, 100B. However, it is anticipated that separate pumping devices may be associated with the secondary and heat exchangers 96A, 96B, 100A, 100B.

It should be appreciated that the thermal modules 92A, 92B described above represents only one exemplary embodiment of a device that may be used to condition the air supplied to the distribution systems 76A, 76B. Any of a variety of differently configured thermal modules may be used to provide conditioned air. Other examples of thermal modules that may be used are described in U.S. Pat. Nos. 6,223,539, 6,119,463, 5,524,439 or 5,626,021, which are hereby incorporated by reference in their entirety. Another example of such a thermal module is currently sold under the trademark Micro-Thermal Module™ by Amerigon, Inc. In another example, the thermal module may comprise a pump device without a thermoelectric device for thermally conditioning the air. In such an embodiment, the pumping device may be used to remove or supply air to the distribution system 76A, 76B. In yet another embodiment, the thermal modules 92A, 92B, may share one or more components (e.g., pumping devices, thermoelectric devices, etc.) with the vehicles general climate control system.

With continued reference to FIG. 4, in operation, fluid in the form of air can be delivered from the thermal modules 92A, 92B, through the ducting 98A, 98B to the distribution systems 76A, 76B. As described above, the air flows through the passages 82A, 82B, into the openings 84A, 84B and then along the distribution layer 86A, 86B and through the covering 74. In this manner, conditioned air can be provided to the front surface 48 of the backrest 34 and the top surface 50 of the seat 32.

In a modified embodiment, air from within the passenger compartment of the automobile can be drawn through the covering 74, into the distribution layer 86A, 86B and through the openings 84A, 84B. The air then can flow through the distribution passages 82A, 82B, into the inlet passage 78A, 78B and then into the ducting 98A, 98B. In this manner, the climate control system 36 can provide suction so that air near the surface of the seat assembly 30 is removed.

A suitable control system (not shown) can be provided to control the climate control system 36 in response to various control routines and/or user inputs. See, e.g., U.S. patent application Ser. No. 11/047,077, filed Jan. 31, 2005, the entire contents of which are hereby incorporated by reference herein.

Figure 5:
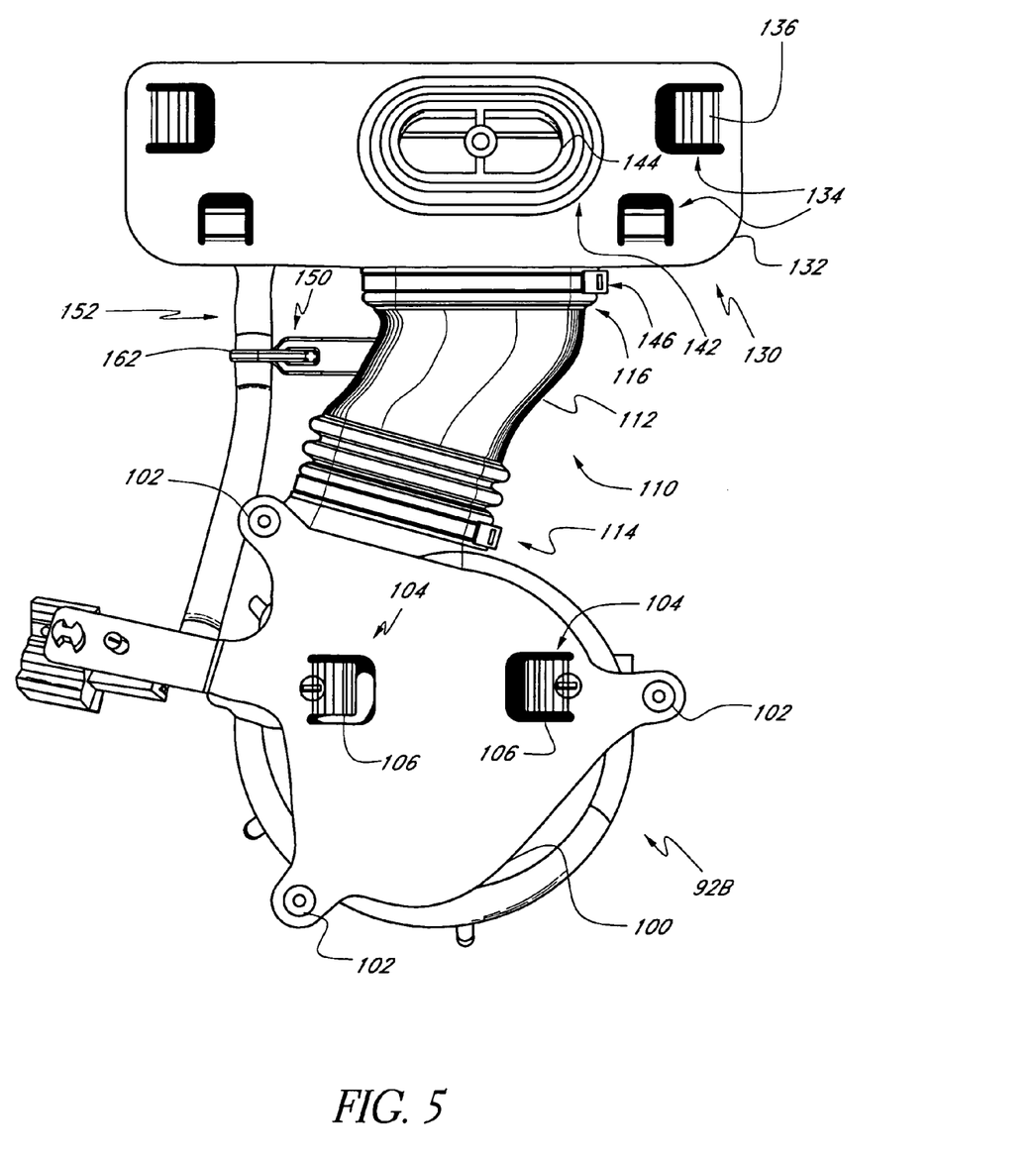
FIG. 5 is a top view of an embodiment of a thermal module and conduit of the vehicle seat assembly of FIG. 1.

The thermal modules 92A, 92B can be coupled to the rear side 56 and the bottom side 70 of the backrest 34 and seat portion 32, respectively. FIG. 5 is a top view of one embodiment for coupling the seat thermal module 92B to the bottom side 70 of the seat portion 32. As shown, the thermal module 92B can be coupled to a bracket 100 via a plurality of fasteners 102 (e.g., bolts, rivets etc.). The bracket 100, in turn, can include a pair of clips 104, which are configured to mate with corresponding engagement features (e.g., tabs, flanges, etc.) provided on the bottom side 70 of the seat portion 32. In the illustrated embodiment, each clip 104 can include a deflectable flange 106 such that the bracket 100 can engage the engagement features in a snap fit. In this manner, the bracket 100 and the thermal module 92B can be removably coupled to the bottom side 70 of the seat portion 32. In modified embodiments, other devices and methods can be used for coupling the bracket 100 to the bottom side 70 of the seat portion 32. For example, the bracket 100 can be attached to the seat portion 32 using adhesives, belts, straps, and/or hook and loop fasteners (e.g., Velcro™).

As shown in FIG. 5, the thermal module 92A is connected to a conduit 110. The conduit 110 includes a body 112 having a first, inlet end 114 and a second, outlet end 116. The second, outlet end, 116 of the conduit 110 is placed in fluid communication with the inlet passage 78B (see e.g., FIG. 4) of the seat distribution system 76B through a transition duct 130. The transition duct 130 is coupled to a bracket 132, which is configured to be removably coupled to the bottom side 70 of the seat portion 32. The bracket 100 can include a set of clips 136, which can be configured as described above mate with corresponding engagement features (e.g., tabs, flanges, etc.) provided on the bottom side 70 of the seat portion 32. Each clip 134 can include a deflectable flange 136 such that the bracket 132 can engage the engagement feature in a snap fit. Of course, as mentioned above, in modified embodiments, other fasteners (straps, belts, hook and loop connections, etc.) can be used to couple the bracket 132 to the bottom side 70 of the seat portion 32.

The bracket 132 is positioned on the outlet end 142 of transition conduit 130. The outlet end 142 forms an outlet opening 144 that is in communication with the inlet passage 78B when the bracket 132 is coupled to the bottom side 70 of the seat portion 78. In the illustrated embodiment, the transition duct 130 is configured to turn the flow 90 degrees with respect to the outlet end 116 of the conduit 110. Thus, an inlet end 146 of the transition duct 130 is arranged such that it can mate with the outlet end 116 of the conduit 110.

With reference now to FIGS. 6-9, the conduit 110 will now be described in further detail. As shown, the inlet end 114 of the body forms a first or inlet port 118 and the outlet end 116 forms a second or outlet port 120. A fluid passage 122 is formed by an inner surface of body 112. The fluid passage 108 extends from an inlet opening 124 formed by the inlet port 118 and an outlet opening 126 formed by the outlet port 120. As shown, in the illustrated embodiment, the passage 122 has a generally elongated oval shape, which generally corresponds to the shape of an outlet passage (not shown) of the seat thermal module 92B. However, it should be appreciated that in modified embodiments the passage 122 can have a different shape, which is similar or different than the shape of the outlet port.

In one embodiment, the body 112 is formed, at least in part, from a flexible material such as, for example, rubber, other elastomers, flexible thermoplastics, and the like. In some embodiments, the ends 114, 116 of the conduit 110 may move with respect to each other as the bottom side 70 of the seat portion 32 is deformed (e.g., as a person sits on the seat 20). During movement, it is advantageous that the cross-sectional area of the passage 122 not be significantly reduced (e.g., by crimping or buckling). Accordingly, in the illustrated embodiment, the body 112 can include a bellow-type configuration portion comprising a plurality of folds 130. In this manner, as the conduit 110 bends, the inner radius may shorten while the outer radius lengthens to substantially preserve the cross-sectional area of the fluid passage 122. In addition, the length of the conduit 110 can be increased or decreased as the bellows 130 expand or contract without significantly compromising the fluid passage 122.

Figure 6:
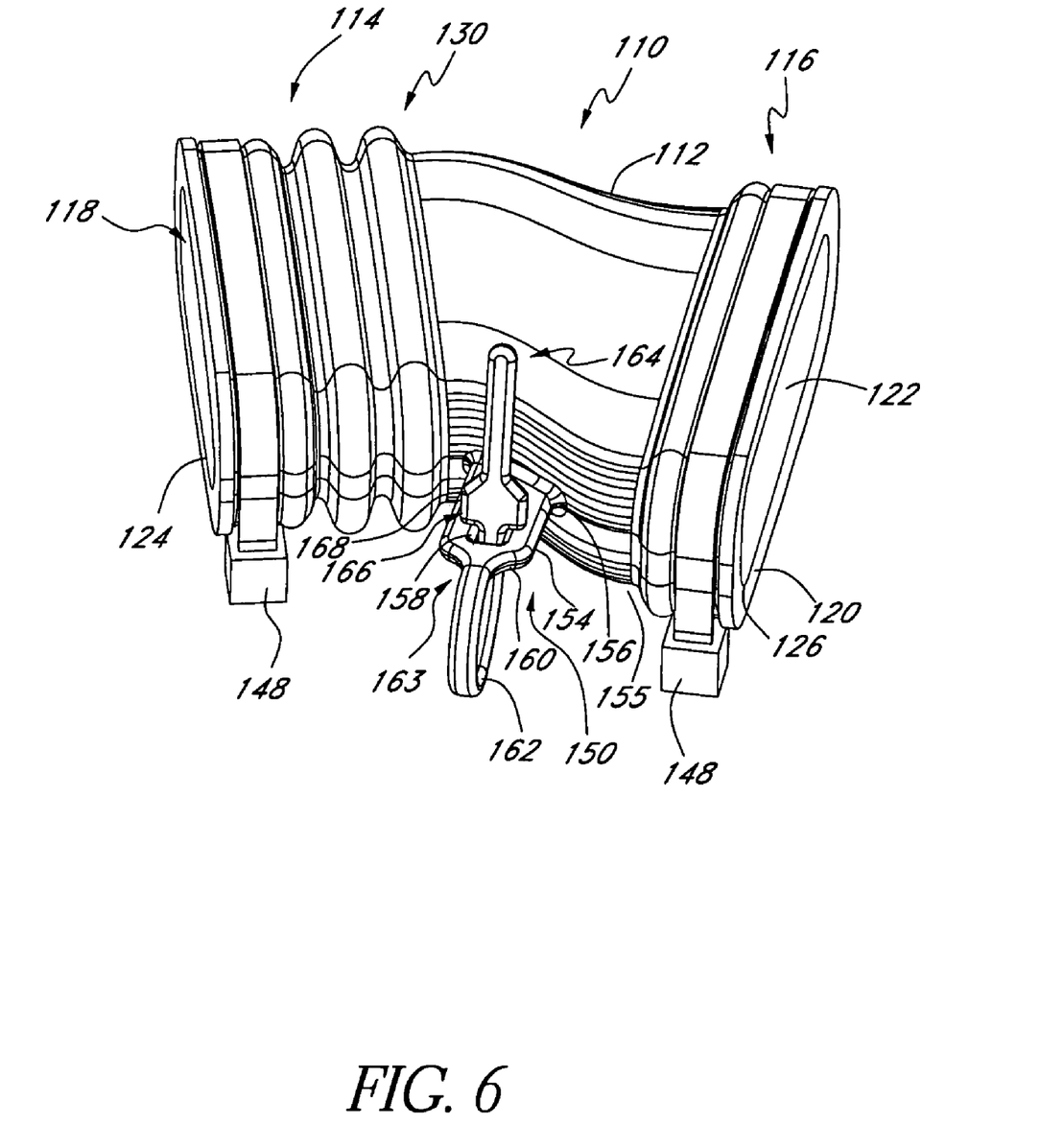
FIG. 6 is a bottom side perspective view of the conduit of FIG. 5.
Figure 7:
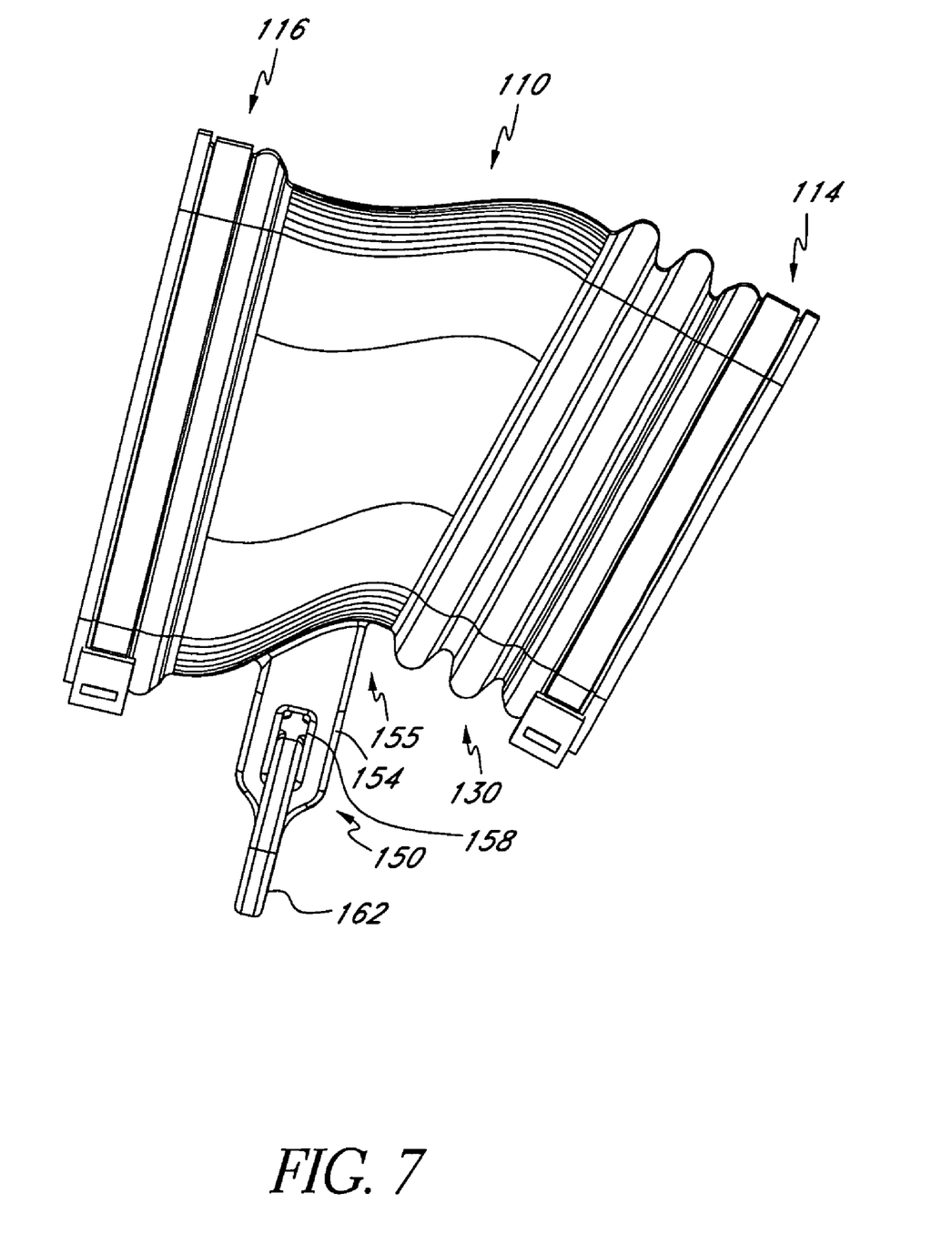
FIG. 7 is a top view of the conduit of FIG. 5.

With reference to FIGS. 5 and 6, in the illustrated embodiment, the conduit 110 is coupled to the outlet of the seat thermal module 92B and the inlet 146 of the transition duct 130 by placing the conduit 110 over these respective components. That is, in the illustrated embodiment, the outlet of the thermal module 92B extends at least partially into the inlet 114 of the conduit 110. In a similar manner, the inlet 146 of the transition duct 110 extends at least partially into the outlet 116 of the conduit 110. The conduit 110 can be secured to outlet/inlet of the thermal module 92B and transition duct 130 respectively with tie straps 148.

As shown in FIGS. 5 and 6, the body 112 can define a non-straight or bent flow path. Thus, in the illustrated embodiment, the ends 114, 116 of the conduit 110 are not aligned with each other. Accordingly, the conduit 110 can be configured to accommodate different geometrical arrangements between the position of the thermal module 92B and the inlet 78B to the distribution system 76B.

With continued reference to FIGS. 5 and 6, the conduit 110 advantageously includes an attachment device 150. As explained above, the thermal module 76B is typically coupled to a wire bundle or harness 152 that provides power and/or control signals to the thermal module 92B. The wire bundle or harness 152 is often referred to in the art as a "pig tail." It is generally desirable that the wire bundle or harness 152 is secured to the bottom side 70 of the seat portion 30 so as to avoid being harmed by objects under the seat portion and to generally reduce damage that can be caused by vibration and/or movement of the seat portion.

The attachment device 150 comprises a base 154 that has a first end 156 that is coupled to or, more preferably, integrally formed with the body 112 of the conduit 110. The base 154 is preferably positioned on a side 155 of the conduit between the inlet and outlet ends 114, 116. In modified embodiments, the device 150 can be positioned on the top, bottom or other locations on the conduit 110. The base 154 forms an opening 158.

The base 154 includes a second end 160 that is generally opposite the first end 156. An elongated flexible strap 162 extends from the second end 160. The strap 162 can be coupled to the base 154 or more preferably can be integrally formed with the base 154. In the illustrated embodiment, the strap 162 has a width w1 (see FIG. 8) that is approximately one third the width w2 of the base 154. The thickness t of the strap 162, in turn, can be approximately the same thickness t as the base 154.

Figure 8:
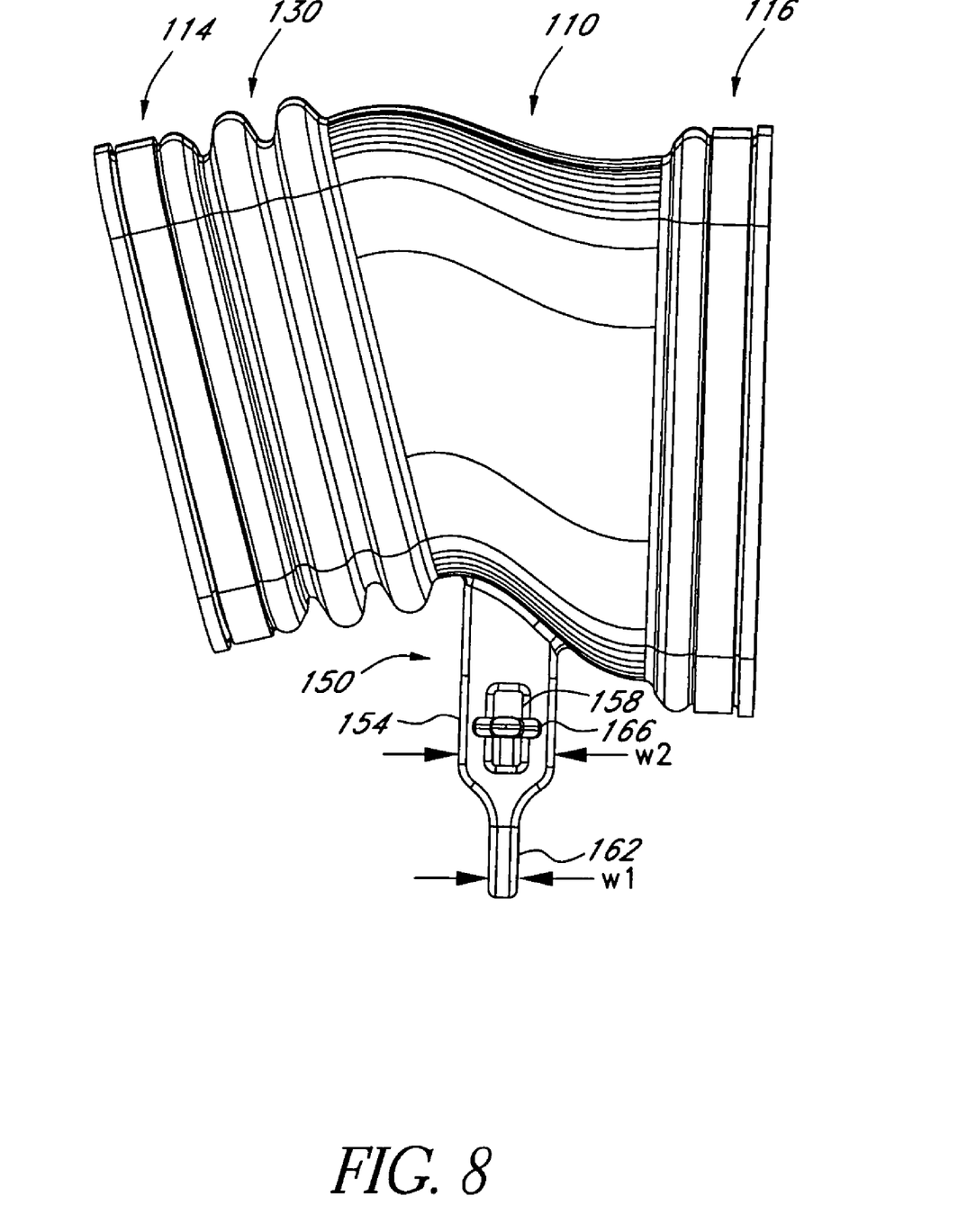
FIG. 8 is a bottom view of the conduit of FIG. 5.
Figure 9:
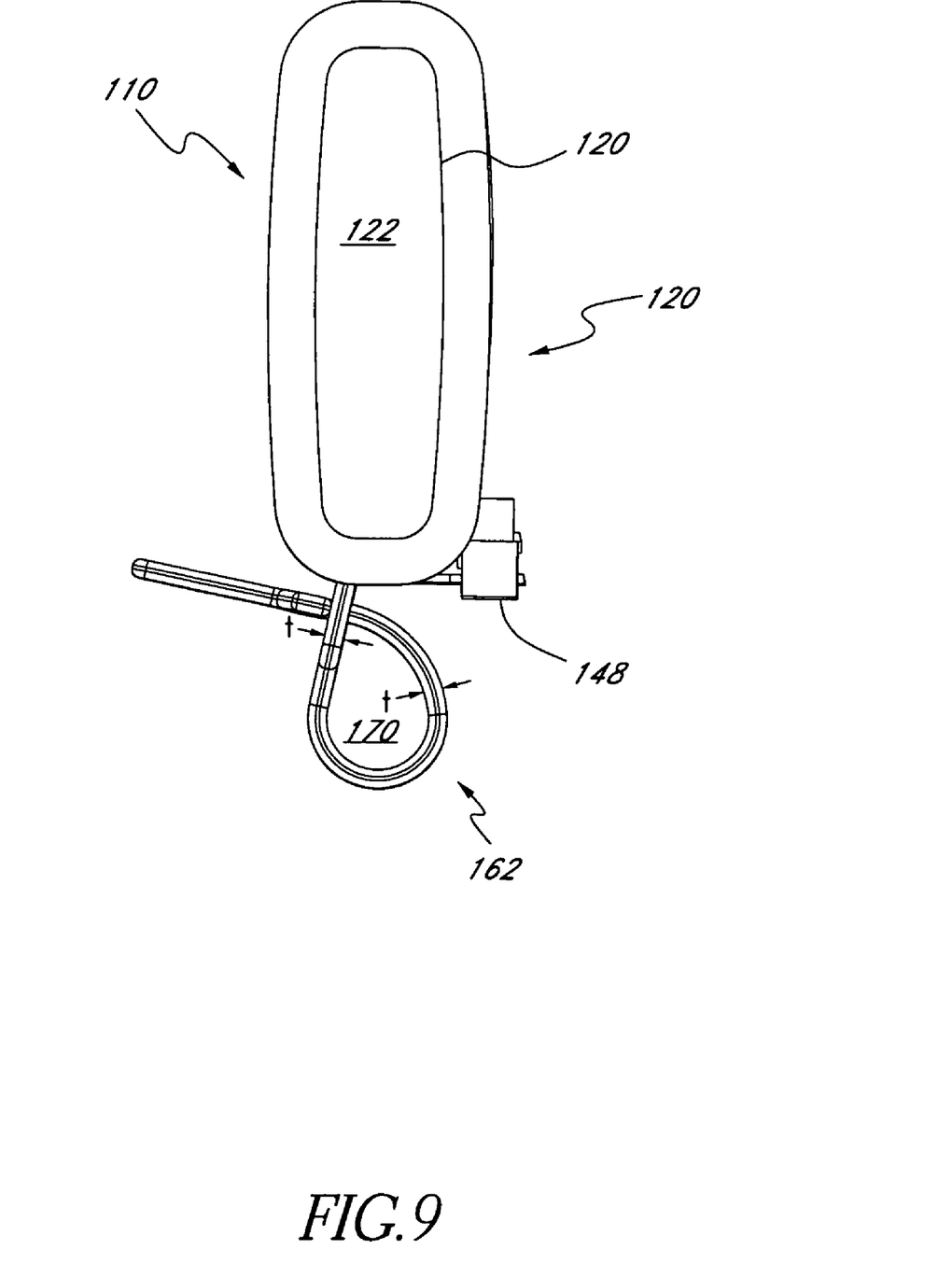
FIG. 9 a front view of the conduit of FIG. 5.

The strap 162 extends from a proximal end 163 at the base 154 to a distal end 164. Between the proximal and distal ends 163, 164 is an enlarged portion 166. The enlarged portion 166 can be coupled to the strap 162 or integrally formed with the strap 162. With reference to FIG. 8, in the illustrated embodiment, the enlarged portion 166 is configured such that in a first position the enlarged portion 166 can be inserted through the opening 158 in the base 154. The enlarged portion 166 can then be rotated to a locked position, which is shown in FIG. 8, such that it cannot be removed from the opening 158. In the illustrated embodiment, the locked position corresponds to a position in which the strap 162 is not twisted with respect to the base 154. The enlarged portion 166 can include a tapered portion 168, which facilities inserting the enlarged portion 166 through the opening 158.

With particular reference to FIG. 5, in one embodiment of use, the attachment device 150 can be used to secure the wire bundle 152 that is coupled to the thermal module 92B. As shown, the strap 162 can be wrapped around the wire bundle and the distal end 164 and enlarged portion 166 can be inserted through the opening 158 in the base 154. The strap 162 can then be rotated to the locked position such that the enlarged portion 166 cannot be removed from the opening 158 (see e.g., FIG. 6). In this manner, the wire bundle 152 can be secured to the conduit 110 without the need for additional parts.

In a preferred embodiment, the attachment device 150 is integrally formed with the conduit 110. For example, the conduit 110 can be formed using a blow molding process. In such a process, the attachment device 150 can be formed using the same mold that is used to form the conduit 110 itself. This procedure advantageously reduces manufacturing steps and the number of parts used in the seat assembly. In modified embodiments, the base 154 and/or the strap 162 can be formed separately and coupled to the conduit 110 in a separate step. In another embodiment, the base 154 can include a deflectable or pivotal tang that engages one or more openings in the strap 162. In this manner, the device 150 can function as a belt.

In another embodiment, the strap 162 can include a plurality of ridges and/or grooves that are configured to move through the opening 158 in a ratchet-type motion. In this manner, the size of the opening 170 (see FIG. 9) defined by the strap 162 can be a adjusted to accommodate wire bundles 152 of different sizes. In still another embodiment, the strap 162 can be configured such that user can secure the strap 162 to the base 154 by forming a knot. In yet another embodiment, the enlarged portion 166 can be attached to the strap 162 after the distal end 164 is inserted through the opening 154.

In another embodiment, the strap 162 and the base 154 are separate components. For example, the conduit 110 can be provided with a base 154 with an opening 158 as described above. The strap 162 can be a separate component from the base 154 and can be wrapped around the wire bundle 152 and tied to or otherwise secured to the base 154.

As mentioned above, it is advantageous to integrally form the attachment device 150 (or at least a portion thereof) with the conduit 110. It is particularly advantageous to form the attachment device 150 with the conduit 110 because in many embodiments the straps 162 are flexible. Thus, in such embodiments, the conduit 110 and the device 150 can be formed from the same flexible material. In a modified embodiment, a portion of the device 150 (e.g., the base 154) can be integrally formed from a less flexible component of the climate control seat assembly 30 (e.g., a hard plastic shell of the thermal module 92B). In such an embodiment, the strap 162 can be formed separately and can comprise a more flexible material than the base 154.

In the illustrated embodiment, the conduit 110 extends between the thermal module 92B and the distribution system 76B of the seat 32. Those of skill in the art will recognize that the conduit 110 and/or attachment device 150 can be provided between thermal module 92A and distribution system 76A of the backrest 34. In addition, the device 150 can be provided on a conduit that extends between or is connected to other components of the climate control seat assembly 30. For example, a conduit can be provided on inlet side of the thermal module 92A, 92B to draw fluid from outside the confines of the seat assembly 30. Such a conduit can include an attachment device 150 according to one or more of the embodiments described above. In another embodiment, a conduit can be provided on a waste side of the thermal module 92A, 92B to direct air outside the confines of the seat assembly. Such a conduit advantageously could also include an attachment device 150 as described above.

To assist in the description of the disclosed embodiments, words such as upward, upper, downward, lower, vertical, horizontal, upstream, and downstream have and used above to describe the accompanying figures. It will be appreciated, however, that the illustrated embodiments can be located and oriented in a variety of desired positions.

Although the foregoing description of the preferred embodiments has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present invention should not be limited by the foregoing discussion, which is intended to illustrate rather than limit the scope of the invention.

What is claimed is:

1. A climate controlled seat assembly, comprising:
    a seat cushion having an outer surface comprising a first side for supporting an occupant in a sitting position and a second side, the first side and the second side generally facing in opposite directions;
    an air passage extending from the second side into the seat cushion;
    a ventilation system in fluid communication with the air passage, the ventilation system configured to distribute air from the passage along a support surface of the seat cushion;
    a fluid transfer system that is configured to deliver or withdraw air from the ventilation system;
    a conduit in fluid communication with the fluid transfer system;
    a wire bundle that is operatively connected to the fluid transfer system; and
    a tie strap that is integrally formed with the conduit and is wrapped around the wire bundle to secure the wire bundle to the conduit.

2. The climate controlled seat assembly as in claim 1, wherein the conduit has a bellow-type configuration portion comprising a plurality of folds.

3. The climate controlled seat assembly as in claim 1, wherein the tie strap includes a base with an opening and a distal end of the tie strap is configured to extend through the opening.

4. The climate controlled seat assembly as in claim 3, wherein the tie strap includes an enlarged portion between the distal end and the base and wherein the enlarged portion is configured such that it can be inserted through the opening in a first position and can resist motion through the opening in a second position.

5. The climate controlled seat assembly of claim 1, wherein the fluid transfer system comprises a heat transfer device.

6. The climate controlled seat assembly of claim 5, wherein the heat transfer device comprises a Peltier Circuit.

7. A method of assembling a climate controlled seat assembly comprising the steps of:
    providing a cushion with a fluid distribution system;
    coupling a fluid transfer device to the seat assembly;
    coupling a conduit to the fluid transfer device;
    operatively connecting a wire bundle to the fluid transfer device; and
    coupling the wire bundle to the conduit wherein the wire bundle is coupled to the conduit using a tie strap, said tie strap being integrally formed to the conduit.

8. The method of claim 7, further comprising threading a distal end of a tie strap through an opening in a base.

9. The method of claim 8, wherein threading the distal end of the tie strap through the opening in the base comprises threading an enlarged portion of the tie strap though the opening.

10. The method of claim 9, further comprising rotating the enlarged portion of the tie strap to prevent the enlarged portion from being removed from the opening.

11. The method of claim 7, wherein the steps of operatively connecting a wire bundle to the fluid transfer device and coupling the wire bundle to the conduit are done before the fluid transfer device is coupled to the seat assembly.

12. A climate controlled seat assembly, comprising:
    a seat cushion having an outer surface comprising a first side for supporting an occupant in a sitting position and a second side, said second side being generally opposite of said first side;
    an air passage extending from the second side at least partially into the seat cushion;
    a ventilation system in fluid communication with the air passage, the ventilation system configured to distribute air from the passage along a support surface of the seat cushion;
    a fluid system configured to selectively deliver or withdraw air from the ventilation system;
    a conduit in fluid communication with the fluid system;
    a wire harness that is connected to the fluid system; and
    a means for securing the wire harness to the conduit, wherein the securing means is integrally formed with the conduit.

* * * * *